(12) United States Patent
Vracar et al.

(10) Patent No.: US 9,344,004 B2
(45) Date of Patent: May 17, 2016

(54) POWER CONVERSION SYSTEM

(75) Inventors: Darko Vracar, Teningen (DE); Nigel Ian Springett, Emmendingen (DE)

(73) Assignee: DET INTERNATIONAL HOLDING LIMITED, George Town (KY)

( * ) Notice: Subject to any disclaimer, the term of this patent is extended or adjusted under 35 U.S.C. 154(b) by 466 days.

(21) Appl. No.: 13/587,121

(22) Filed: Aug. 16, 2012

(65) Prior Publication Data

US 2013/0044527 A1    Feb. 21, 2013

(30) Foreign Application Priority Data

Aug. 17, 2011    (EP) .................................... 11405303

(51) Int. Cl.
    *H02M 7/537*    (2006.01)
    *H02M 7/487*    (2007.01)

(52) U.S. Cl.
    CPC .................... *H02M 7/487* (2013.01)

(58) Field of Classification Search
    CPC .............................. H02M 7/487; H02M 7/537
    USPC .................... 363/17, 56.02, 98, 132
    See application file for complete search history.

(56) References Cited

U.S. PATENT DOCUMENTS

| | | | |
|---|---|---|---|
| 5,274,542 A | 12/1993 | Tanaka et al. | |
| 5,684,688 A * | 11/1997 | Rouaud et al. | 363/132 |
| 8,427,010 B2 | 4/2013 | Bose et al. | |
| 2005/0139259 A1* | 6/2005 | Steigerwald et al. | 136/293 |
| 2005/0141248 A1* | 6/2005 | Mazumder et al. | 363/39 |
| 2005/0281065 A1* | 12/2005 | Nojima | 363/98 |
| 2006/0245222 A1* | 11/2006 | Nojima | 363/132 |
| 2010/0141041 A1 | 6/2010 | Bose et al. | |

FOREIGN PATENT DOCUMENTS

DE    10 2009 002 332 A1    10/2010
JP    10-94164 A    4/1998

OTHER PUBLICATIONS

Chinese Office Action dated Dec. 5, 2014 issued in related Chinese Application No. 201210293745.2.
B. Vafakhah, et al. "Multi-Carrier Interleaved PWM Strategies for a New Five-Level NPC Inverter Using a 3-Phase Coupled Inductor" Energy Conversion Congress and Exposition (ECCE), 2010 IEEE, Sep. 12, 2010, pp. 2312-2319.
European Office Action dated Sep. 7, 2015 issued in related Application No. 11 405 303.6.
Il-Oun Lee, et al. "Interleaved Buck Converter Having Low Switching Losses and Improved Step-Down Conversion Ratio", Power Electronics and ECCE Asia (ICPE & ECCE), 2011 IEEE 8th International Conference, May 30, 2011, pp. 2136-2143.

* cited by examiner

*Primary Examiner* — Jue Zhang
(74) *Attorney, Agent, or Firm* — Birch, Stewart, Kolasch & Birch, LLP

(57) ABSTRACT

The invention relates to a power conversion system, wherein a first switch is connected between a input voltage source and a second switch, wherein the second switch is connected to a third switch, wherein the third switch is connected to a fourth switch, wherein the fourth switch is connected to the input voltage source, wherein a first diode is connected between a neutral point and the second switch, wherein a second diode is connected between the third switch and the neutral point. Two or more current transformers are arranged such that a drive signal is produced in an interleaved mode.

20 Claims, 7 Drawing Sheets

POWER CONVERSION SYSTEM

TECHNICAL FIELD

The invention relates to a power conversion system and a method for power conversion, wherein a first switch is connected between an upper end of a input voltage source and an upper end of a second switch, wherein the lower end of the second switch is connected to an upper end of a third switch, wherein the lower end of the third switch is connected to an upper end of a fourth switch, wherein the lower end of the fourth switch is connected to the lower end of the input voltage source, wherein a first diode is connected in conducting direction between a neutral point and the upper end of the second switch, wherein a second diode is connected between the lower end of the third switch and the neutral point.

BACKGROUND ART

In three level inverter (TLI) technology, the neutral point clamped (NPC) inverter was the first multilevel topology widely implemented by the industry. The NPC inverter continues to be extensively used in high voltage and high power applications such as high voltage direct current (HVDC) power transmission. The topology is basically based on three phases, wherein each phase includes four serially connected switches and two diodes connected to neutral point or mass. By switching the four switches appropriately, a three level output on each phase is provided, namely the levels +V, 0, and −V of the input voltage are provided on the output of each phase. Through appropriate shift of the switching times in the different phases, the NPC inverter may deliver power of a direct current (DC) voltage source to a power grid (PG). Hence, the NPC inverter may be used to deliver electrical energy produced in a solar cell power plant into the public electric power system, for example. In present NPC inverters, Insulated Gate Bipolar Transistor (IGBT) switches are used, in particular in order to provide for small switching losses. Similarly, it is also known to use Metal Oxide Semiconductor Field-Effect Transistors (MOSFETs) or Junction Gate Field-Effect Transistors (JFETs).

In presently known NPC inverters, charge pump or bootstrap circuits are the circuits of choice for control of the switches. However, such circuits increase in particular the complexity of the NPC inverter.

SUMMARY OF THE INVENTION

It is the object of the invention to create a power conversion system pertaining to the technical field initially mentioned, that has an alternative control circuit for the switches, which in particular provide for a simple design.

The solution of the invention is specified by the features of the independent claims According to the invention two or more current transformers are arranged such that a drive signal is produced in an interleaved mode. The terms "upper end" and "lower" end of a switch or input source are to be interpreted when the power conversion system is substantially vertically arranged. The power conversion system may relate to any kind of power conversion, namely to an AC to DC conversion, to a DC to AC conversion, to a DC to DC conversion or to an AC to AC conversion (AC: alternate current, DC: direct current). In particular, the power conversion system may relate to a power inverter, namely a DC to AC conversion.

The two or more current transformers may be arranged at any suitable location of the power conversion system. A first current transformer may be arranged at a first location and a second current transformer at a second location. A first primary current on the primary winding of the first current transformer is transformed into a first secondary current on the secondary winding of the first current transformer. A second primary current on the primary winding of the second current transformer is transformed into a second secondary current on the secondary winding of the second current transformer. The first and the second secondary winding currents form the basis to produce a drive signal in an interleaved mode. Hence, in a first time window the first secondary current forms the basis to produce the drive signal and in a second time window the second secondary current forms the basis to produce the drive signal. Hence, currents at two or more locations of the power conversion system provide a basis for producing the drive signal. Accordingly, a simple design is achieved, because appropriate currents can be selected to produce the drive signal.

Preferably, the first switch and the fourth switch include a semi-conductor of a first manufacturing technology, in particular a MOSFET switch (MOSFET: Metal Oxide Semiconductor Field-Effect Transistor), a JFET (JFET: Junction Gate Field-Effect Transistor) switch or a IGBT (IGBT: Insulated Gate Bipolar Transistor) switch, and that the second switch and the third switch include a semi-conductor of a second manufacturing technology, in particular a BJT switch (BJT: Bipolar Junction Transistor). The first switch and the fourth switch are operated at a higher frequency than the second switch and the third switch. While the first switch and the fourth switch include a semi-conductor of a first technology, the second switch and the third switch include a semi-conductor of a second technology. The first technology may be designed to reduce switching losses and the second technology to reduce conduction losses. Typical examples of semi-conductors which reduce the switching losses are MOSFET, JFET, or IGBT switches. On the other hand, a typical example to reduce conduction losses are BJT switches. However, depending on a desired efficiency, the skilled person may choose any desired switches in order to reduce switching losses and conduction losses.

Preferably, a first capacitor is connected between the upper end of the input voltage source and the neutral point, and a second capacitor is connected between the neutral point and the lower end of the input voltage source, in order to stabilize the input source.

In a preferred embodiment, diodes are connected in conducting direction between the lower end and the upper end of the first, second, third and fourth switches, which form freewheeling diodes.

Preferably, the lower end of the first switch is connected through the primary winding of a second current transformer to the upper end of the second switch and that the first diode is connected through the primary winding of a first current transformer to the upper end of the second switch, and/or the lower end of the third switch is connected through the primary winding of a third current transformer to the upper end of the fourth switch and that the upper end of the fourth switch (OA4) is connected through the primary winding (TA4P) of a fourth current transformer to the second diode (DA2). The switches of the power conversion system may be controlled according to the currents measured by the current transformers.

Preferably, the secondary winding of a first current transformer is connected in conducting direction through a diode to a control port of the second switch, and/or the secondary winding of a second current transformer is connected in conducting direction through a diode to a control port of the second switch, and/or the secondary winding of a third current transformer is connected in conducting direction through a diode to a control port of the third switch, and/or the secondary winding of a fourth current transformer is connected in conducting direction through a diode to a control port of the third switch. Hence, the second and third switch of the power conversion system may be controlled according to the currents measured by the current transformers.

In a preferred embodiment, the lower end of the second switch is connected through a first control block and a resistor to a control port of the second switch, and/or that the lower end of the third switch is connected through a second control block and a resistor to a control port of the third switch. Accordingly, the second switch and the third switch may be further controlled, in particular for initial turn-on and turn-off of the switches when the current is close to zero.

Preferably, the connection point between the second switch and the third switch is connected to a load. The power conversion system may therefore be used to deliver power to any desired load.

In a preferred embodiment, multiple phases, in particular 3 phases, are provided, wherein each phase includes a first switch, a second switch, a third switch, a fourth switch, a first diode, a second diode, wherein in each phase if applicable a first current transformer, a second current transformer, a third current transformer, a fourth current transformer, and/or control blocks are provided as previously defined, wherein the connection point between the second switch and the third switch is connected to a load, in particular to a power grid or to an electric power system. The power conversion system can therefore be adapted to any multiphase power grid or electric power system, in particular to the widely available 3 phase electric power system, such that power generated in a power plant, for example a solar power plant, can be efficiently delivered to the electric power system.

In a method for power conversion, a first switch, a second switch, a third switch, and a fourth switch are switched according to a switching states table, wherein the first switch is connected between an upper end of a input voltage source and an upper end of the second switch, wherein the lower end of the second switch is connected to an upper end of the third switch, wherein the lower end of the third switch is connected to an upper end of the fourth switch, wherein the lower end of the fourth switch is connected to the lower end of the input voltage source, wherein a first diode is connected in conducting direction between a neutral point and the upper end of the second switch, wherein a second diode is connected between the lower end of the third switch and the neutral point, characterized in that two or more transformers are operated to produce a drive signal in an interleaved mode. Because the two or more transformers can be arranged at any suitable location, the drive signal is produced in a simple manner.

Preferably, the first switch and the fourth switch include a semi-conductor of a first manufacturing technology, in particular a MOSFET switch, a JFET switch or a IGBT switch, and that the second switch and the third switch include a semi-conductor of a second manufacturing technology, in particular a BJT switch. Because in the present method for power conversion switches of different technologies are included, efficiency of the power conversion is improved, in particular with respect to switching losses and conduction losses.

Preferably, in a first switching state the first switch and the second switch are switched on and the third switch and the fourth switch are switched off, that in a second switching state the first switch is switched off and the second switch and the third switch are switched on and the fourth switch is switched off, and that in a third switching state the first switch and the second switch are switched off and the third switch and the fourth switch are switched on. Using such a switching table, a three level conversion is provided, while a simple design is maintained.

In a preferred embodiment, the second switch and the third switch) are controlled through a first current transformer, a second current transformer, a third current transformer, and a fourth current transformer, wherein the lower end of the first switch is connected through the primary winding of the second current transformer to the upper end of the second switch, and the lower end of the third switch is connected through the primary winding of the third current transformer to the upper end of the fourth switch, wherein the first diode is connected through the primary winding of the first current transformer to the upper end of the second switch, and the upper end of the fourth switch is connected through the primary winding of the fourth current transformer to the second diode, wherein the secondary winding of the first current transformer is connected in conducting direction through a diode to a control port of the second switch, and that the secondary winding of the second current transformer is connected in conducting direction through a diode to a control port of the second switch, and that the secondary winding of a third current transformer is connected in conducting direction through a diode to a control port of the third switch, and that the secondary winding of the fourth current transformer is connected in conducting direction through a diode to a control port of the third switch. The current transformers provide necessary signals in order to appropriately control the switches in the power conversion method, in particular in order to appropriately control the second switch and the third switch.

Preferably, the second switch and the third switch are controlled through a first control block and a second control block, wherein the lower end of the second switch is connected through the first control block and a resistor to a control port of the second switch, and/or that the lower end of the third switch is connected through the second control block and a resistor to a control port of the third switch. Accordingly, the second switch and the third switch may be further controlled, in particular for initial turn-on and turn-off of the switches when the current is close to zero.

In a preferred embodiment, multiple phases, in particular 3 phases, are controlled, wherein each phase includes a first switch, a second switch, a third switch, a fourth switch, a first diode, a second diode, wherein in each phase if applicable a first current transformer, a second current transformer, a third current transformer, a fourth current transformer, and/or control blocks are provided as previously defined, wherein the connection point between the second switch and the third switch is connected to a load, in particular to a power grid or to an electric power system. The method for power conversion can therefore be adapted to any multiphase power grid or electric power system, in particular to the widely available 3 phase electric power system, such that power generated in a power plant, for example a solar power plant, can be efficiently delivered to the electric power system.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
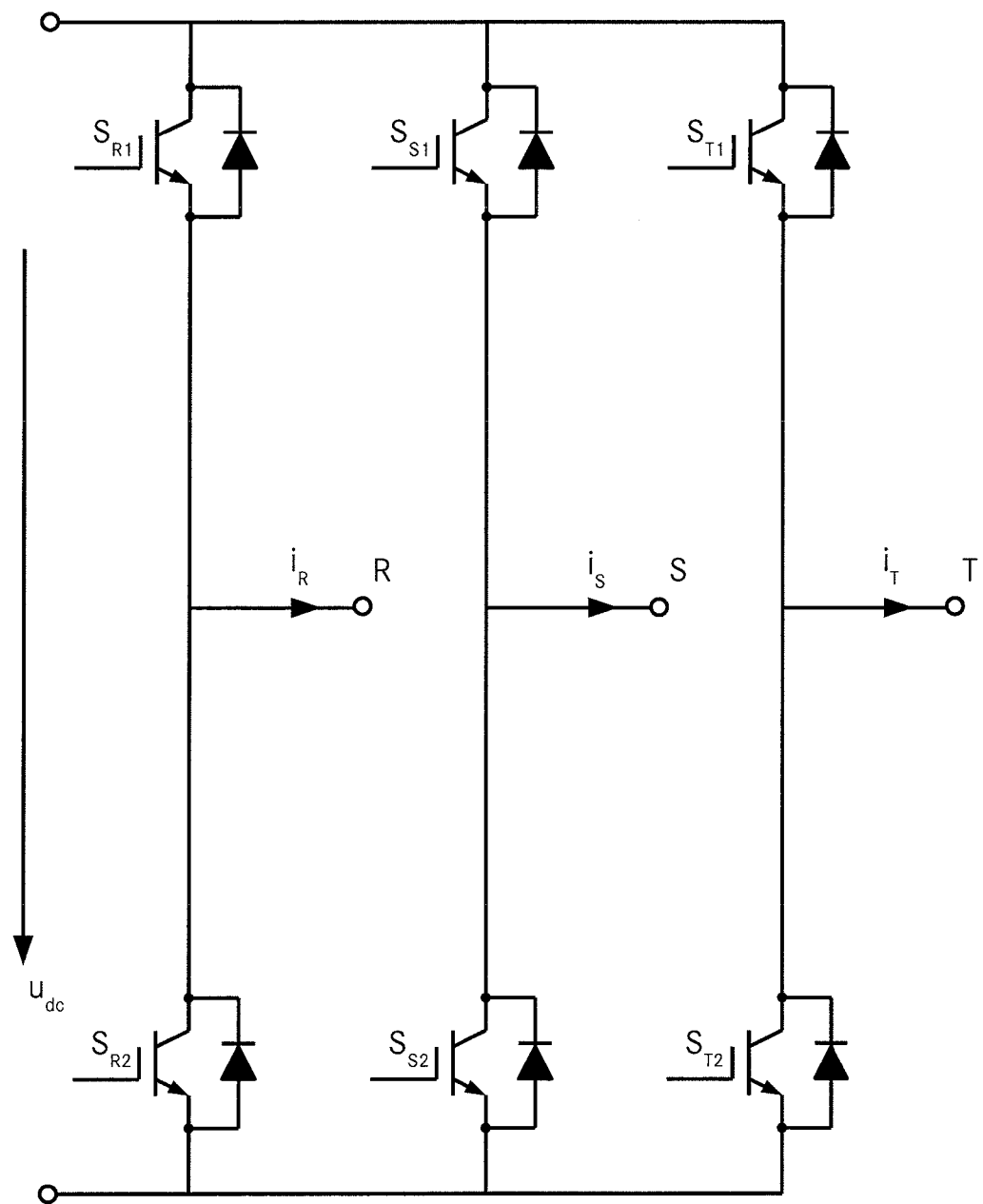
FIG. 1 a standard three-phase inverter.

FIG. 1 shows a standard three-phase inverter with three half-bridges and three phases R, S, T. The input source $u_{dc}$ is connected to the one ends of three first switches $S_{R1}$, $S_{S1}$, $S_{T1}$. The other ends of the first switches $S_{R1}$, $S_{S1}$, $S_{T1}$ form the three phases R, S, T and are further connected to one ends of three second switches $S_{R2}$, $S_{S2}$, $S_{T2}$. The other ends of the three second switches $S_{T2}$, $S_{S2}$, $S_{T2}$ are connected to the input source $u_{dc}$. The three first switches $S_{R1}$, $S_{S1}$, $S_{T1}$ and the three second switches $S_{R2}$, $S_{S2}$, $S_{T2}$ are alternatively switched on and off in order to produce a variable frequency and voltage at the three phases R, S, T from the DC input source $u_{dc}$.

Figure 2:
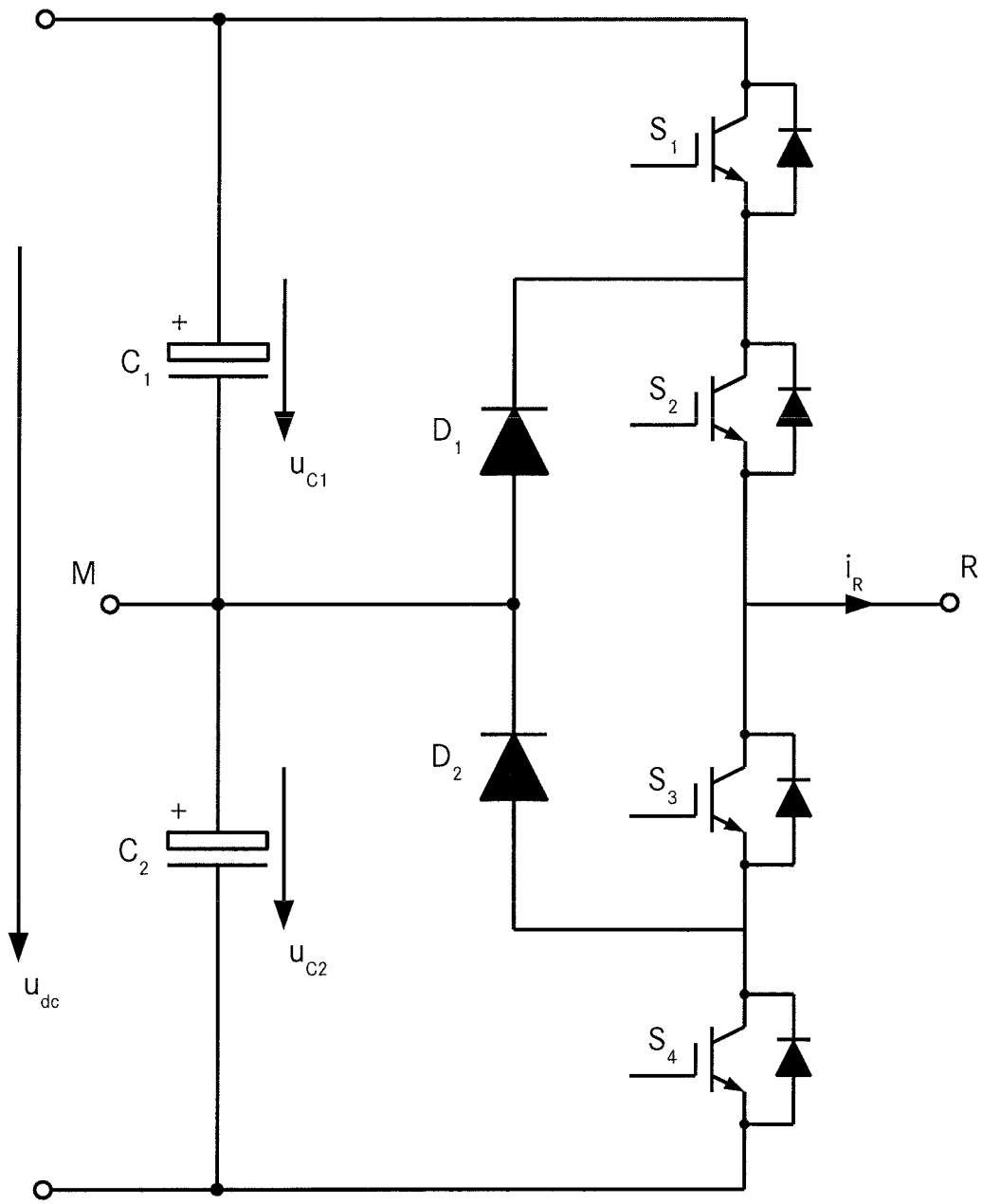
FIG. 2 one leg of a three-phase three-level NPC inverter.

FIG. 2 shows one leg of a three-phase three-level NPC inverter (NPC: Neutral Point Clamped), which was the first multilevel topology widely implemented by the industry and continues to be extensively used in high voltage and high power applications such as HVDC power transmission (HVDC: High Voltage Direct Current). A first capacitor $C_1$ and a second capacitor $C_2$ are connected to mass M. The first voltage $u_{C1}$ over capacitor $C_1$ and the second voltage $u_{C2}$ over second capacitor $C_2$ sum up to the input voltage $u_{dc}$. One end of the first capacitor $C_1$ is connected through a first switch $S_1$ and a second switch $S_2$ to the output R. A first diode $D_1$ is connected in conducting direction between the mass M and the connection point of the first switch $S_1$ and the second switch $S_2$. The output R is connected through a third switch $S_3$ and a fourth switch $S_4$ to one end of the second capacitor $C_2$. A second diode $D_2$ is connected in conducting direction between the connection point of the third switch $S_3$ and the fourth switch $S_4$ and the mass M.

The switching state table representing the basic principle for the generation of output voltages for traditional control is as follows:

| Output | Switching States | | | |
| --- | --- | --- | --- | --- |
| Level | $S_1$ | $S_2$ | $S_3$ | $S_4$ |
| $u_{dc}/2$ | 1 | 1 | 0 | 0 |
| 0 | 0 | 1 | 1 | 0 |
| $-u_{dc}/2$ | 0 | 0 | 1 | 1 |

The NPC inverter is a three level inverter, which has smaller output voltage steps than two level inverters. The NPC inverter can produce three voltage levels on the output, namely $u_{dc}/2$, 0, and $-u_{dc}/2$, whereas a two level inverter can only connect the output either to $u_{dc}/2$ or $-u_{dc}/2$. The cleaner output waveform of a three level inverter provides an effective switching frequency twice that of the actual switching frequency. In case an output filter is required, the components will be smaller and less costly than for a two level inverter. The switches $S_1$, $S_2$, $S_3$, $S_4$ are MOSFET (Metal Oxide Semiconductor Field-Effect Transistor), JFET (Junction Gate Field-Effect Transistor) or IGBT (Insulated Gate Bipolar Transistor) switches. As each leg of a three level inverter has four switches connected in series, the applied voltage on the switches is one-half of a conventional two level inverter. In addition to the capability of handling higher voltages, the NPC inverter has the advantage of lower line-to-line and common-mode steps as well as lower output current ripple. Clamp diodes $D_1$, $D_2$ provide the connection to the neutral point.

Figure 3:
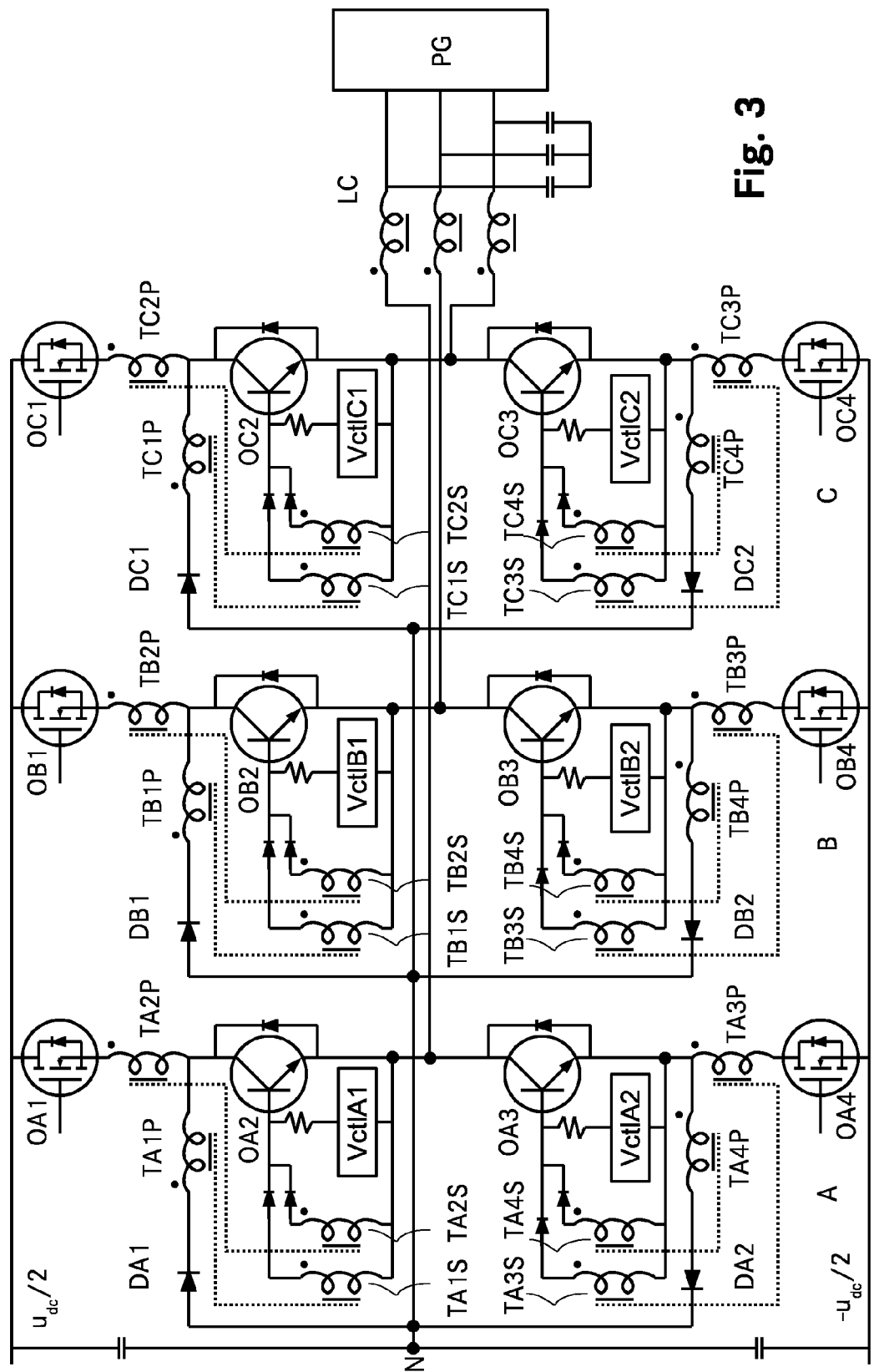
FIG. 3 a NPC inverter according to the invention.

FIG. 3 shows the NPC inverter according to the invention. The NPC inverter has three phases A, B, C. Each of the phases A, B, C includes first and fourth outer switches OA1, OA4, OB1, OB4, OC1, OC4 and second and third middle switches OA2, OA3, OB2, OB3, OC2, OC3. In particular, one end of the first (outer) switches OA1, OB1, OC1 is connected to positive input source $u_{dc}/2$ and one end of the fourth (outer) switches OA4, OB4, OC4 is connected to negative input source $-u_{dc}/2$. The other ends of the first and fourth (outer) switches OA1, OA4, OB1, OB4, OC1, OC4 are connected towards the second and third (middle) switches OA2, OA3, OB2, OB3, OC2, OC3.

As known in current NPC inverters, the outer switches OA1, OA4, OB1, OB4, OC1, OC4 of the NPC inverter according to the invention are MOSFET, JFET, or IGBT switches. However, the middle switches OA2, OA3, OB2, OB3, OC2, OC3 are BJT switches (BJT: Bipolar Junction Transistor). Compared to a MOSFET switch, a BJT switch has a high transconductance. As can be seen from the switching states discussed in FIG. 2, the middle switches are on for a long time of a cycle, resulting in greater conducting loss than for the outer switches, but far less switching loss. Hence, BJT switches have the advantage of reducing the conduction losses.

The other ends of the first and fourth (outer) switches OA1, OA4, OB1, OB4, OC1, OC4 are connected to the primary winding of second and third current transformers TA2P, TA3P, TB2P, TB3P, TC2P, TC3P, which are further connected to first and fourth current transformers TA1P, TA4P, TB1P, TB4P, TC1P, TC4P. The primary windings of the first current transformers TA1P, TB1P, TC1P are connected with first diodes DA1, DB1, DC1 in non-conducting direction to neutral point N. The primary windings of the fourth current transformers TA4P, TB4P, TC4P are connected with second diodes DA2, DB2, DC2 in conducting direction to neutral point N.

The primary winding of the second and third current transformers TA2P, TA3P, TB2P, TB3P, TC2P, TC3P are further connected to the second and third (middle) switches OA2, OA3, OB2, OB3, OC2, OC3. The second and third (middle) switches OA2, OA3, OB2, OB3, OC2, OC3 are connected to each other and build up the phases of the inverter, which are further connected through a circuit LC comprising inductive and/or capacitive elements to a power grid PG.

Each second and third BJT switch OA2, OA3, OB2, OB3, OC2, OC3 includes a basis, a collector, and an emitter. As described above, the emitter of one BJT switch is connected to the collector of another BJT switch, thus forming a phase of the inverter. The collector of the one BJT switch is connected to the primary winding of one second current transformer and the emitter the other BJT switch is connected to the primary winding of one third current transformer.

Between the emitter and the basis of each second and third switch OA2, OA3, OB2, OB3, OC2, OC3, a control circuit is arranged. Each control circuit comprises a first, a second and a third circuit block, which are connected in parallel. First circuit blocks include a first control block VctlA1, VctlB1, VctlC1 or a second control block VctlA2, VctlB2, VctlC2 comprising a voltage signal generator at f=50 Hz connected in series to a resistor. Second circuit blocks include the secondary winding of the second or fourth current transformers TA2S, TA4S, TB2S, TB4S, TC2S, TC4S which are serially connected to a diode, wherein the diode is oriented in conducting direction between the emitter and the basis. Third circuit blocks include the secondary winding of the first and third current transformers TA1S, TA3S, TB1S, TB3S, TC1S, TC3S which are serially connected to a diode, wherein the diode is oriented in conducting direction between the emitter and the basis.

Each of the first, second, third, and fourth switches OA1, OA2, OA3, OA4, OB1, OB2, OB3, OB4, OC1, OC2, OC3, OC4 has a diode arranged in parallel, wherein the diode is oriented in conduction direction between the ends of the switch towards the negative input source $-u_{dc}/2$ and the positive input source $u_{dc}/2$.

Capacitors are arranged between the positive input source $u_{dc}/2$ and neutral point N as well as between neutral point N and negative input source $-u_{dc}/2$.

The inverter has two middle switches which are switched at mains frequency.

The voltage control signal of the control circuit described above is needed only for initial turn-on (and turn-off) of the BJT switch (when the current is close to zero), so its current handling capability can be very small.

The parameters of the current transformers are application specific.

The main idea is to use two or more interleaved current transformers (at high switching frequency) to produce a nominally continuous low frequency current.

Figure 4:
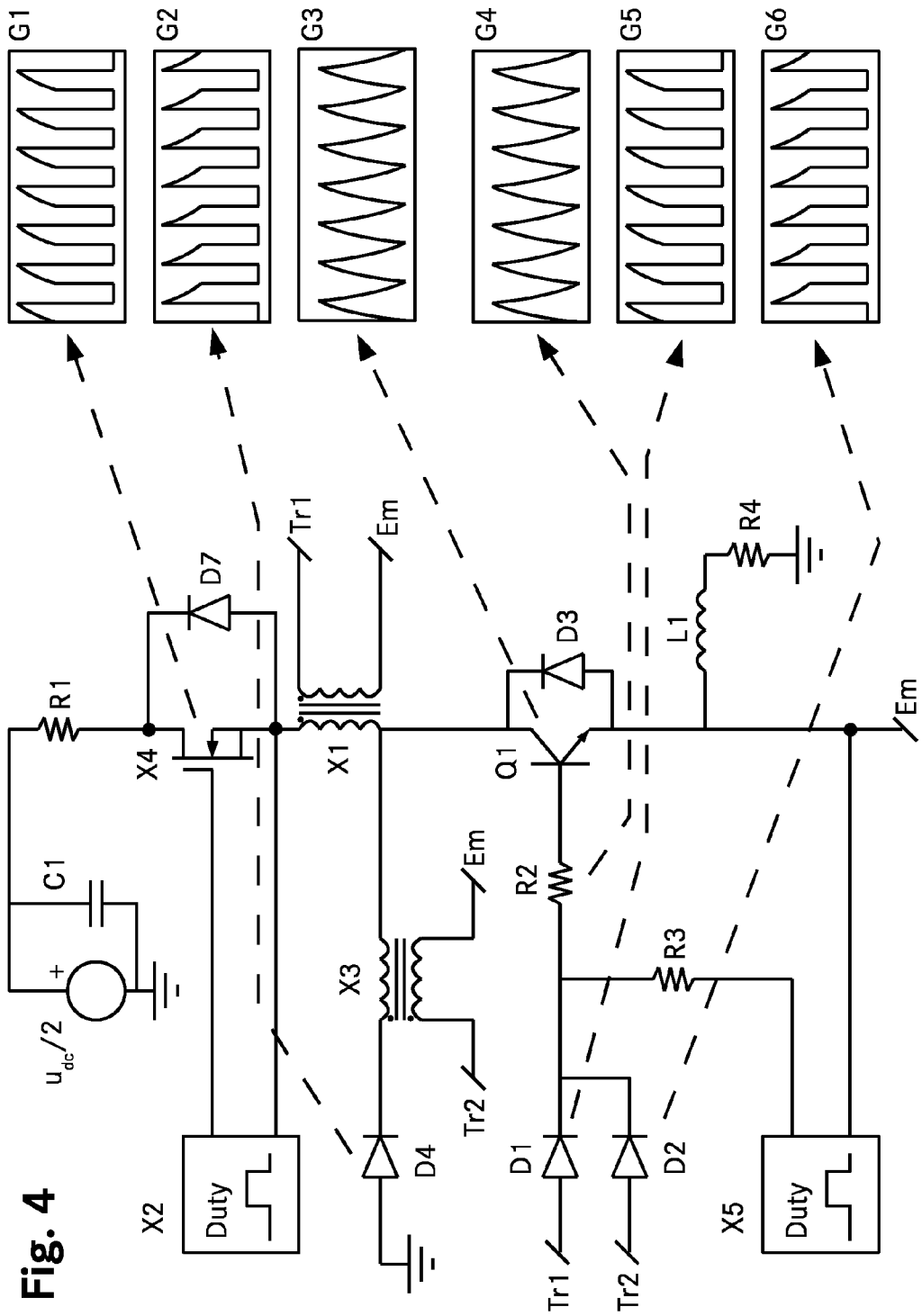
FIG. 4 simulation model for the upper part of the inverter.

FIG. 4 shows schematically the simulation model for Uout>0 and Iout>0. It covers the switching states Uout=+ $u_{dc}/2$ and Uout=0. The turn-off of the NPN switch Q1 is not considered.

FIG. 4 shows the upper part of one phase of the inverter. The input source $u_{dc}/2$ is connected in parallel to a capacitor C1. The drain of MOSFET switch X4 is connected through resistor R1 to the positive end of input source $u_{dc}/2$. The MOSFET switch X4 may be a HiPerFET™ Power MOSFET IXFH32N50, for example. Between the source and the drain of MOSFET switch X4, a diode D7 is arranged in conducting direction. The source of MOSFET switch X4 is further connected to the control block X2 and to the primary winding of current transformer X1. The control block X2 is further connected to the gate of MOSFET switch X4 and may have a duty cycle of F=10 kHz, for example. The primary winding of current transformer X1 is further connected to the primary winding of current transformer X3, which is further connected through a diode D4 to neutral point or mass in non-conducting direction. The primary winding of current transformer X1 is further connected to the collector of BJT switch Q1. The BJT switch Q1 may be a High-Power silicon transistor 2N6277, for example. Between the emitter and the collector of BJT switch Q1, a diode D3 is arranged in conducting direction. The emitter of BJT switch Q1 is further connected to the control block X5. The control block X5 is connected through resistor R3 and resistor R2 to the base of the BJT switch Q1. The control block X5 may have a frequency of F=50 Hz, for example. The emitter of the BJT switch Q1 is connected to inductor L1, which is further connected to the neutral point or mass connected resistor R4. The emitter of the BJT switch Q1 is connected to the secondary winding of current transformer X3, which secondary winding is further connected in conducting direction through diode D2 to the connection point between resistor R3 and resistor R2. The emitter of the BJT switch Q1 is also connected to the secondary winding of current transformer X1, which secondary winding is further connected in conducting direction through diode D1 to the connection point between resistor R3 and R2.

In FIG. 4, the current amplitude versus time are quantitatively shown in graphs G1, G2, G3, G4, G5, G6 at various locations of the circuit. Graph G1 shows the current through MOSFET switch X4. Graph G2 shows the current through diode D4. Graph G3 shows the current through BJT switch Q1. Graph G4 shows the current through resistor R2. Graph G5 shows the current through diode D1. Graph G6 shows the current through diode D2.

Figure 5:
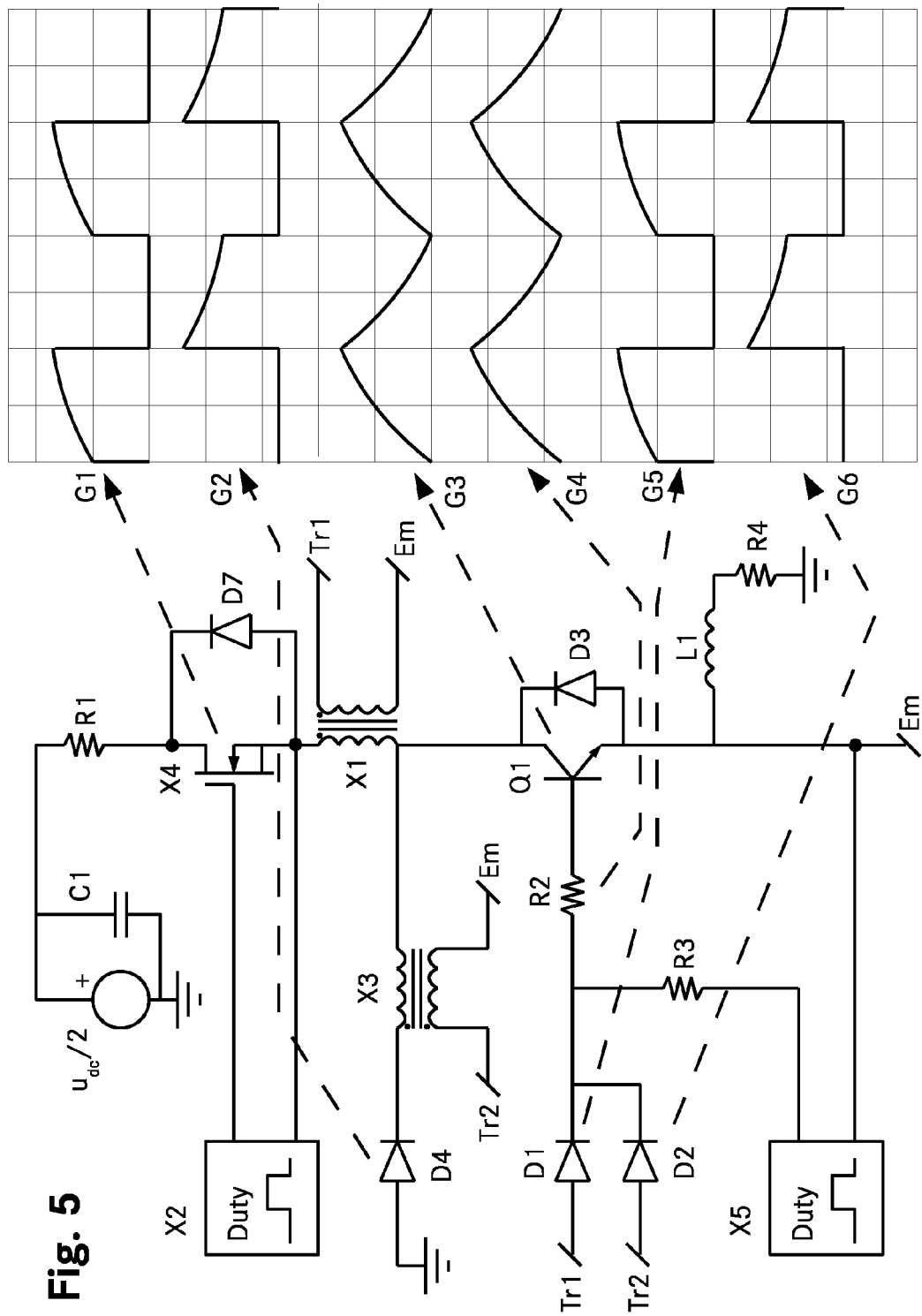
FIG. 5 timing diagram for the upper part of the inverter.

FIG. 5 shows quantitatively the timing diagram of the current amplitude versus time at the already described various locations of the upper part of one phase of the inverter.

Figure 6:
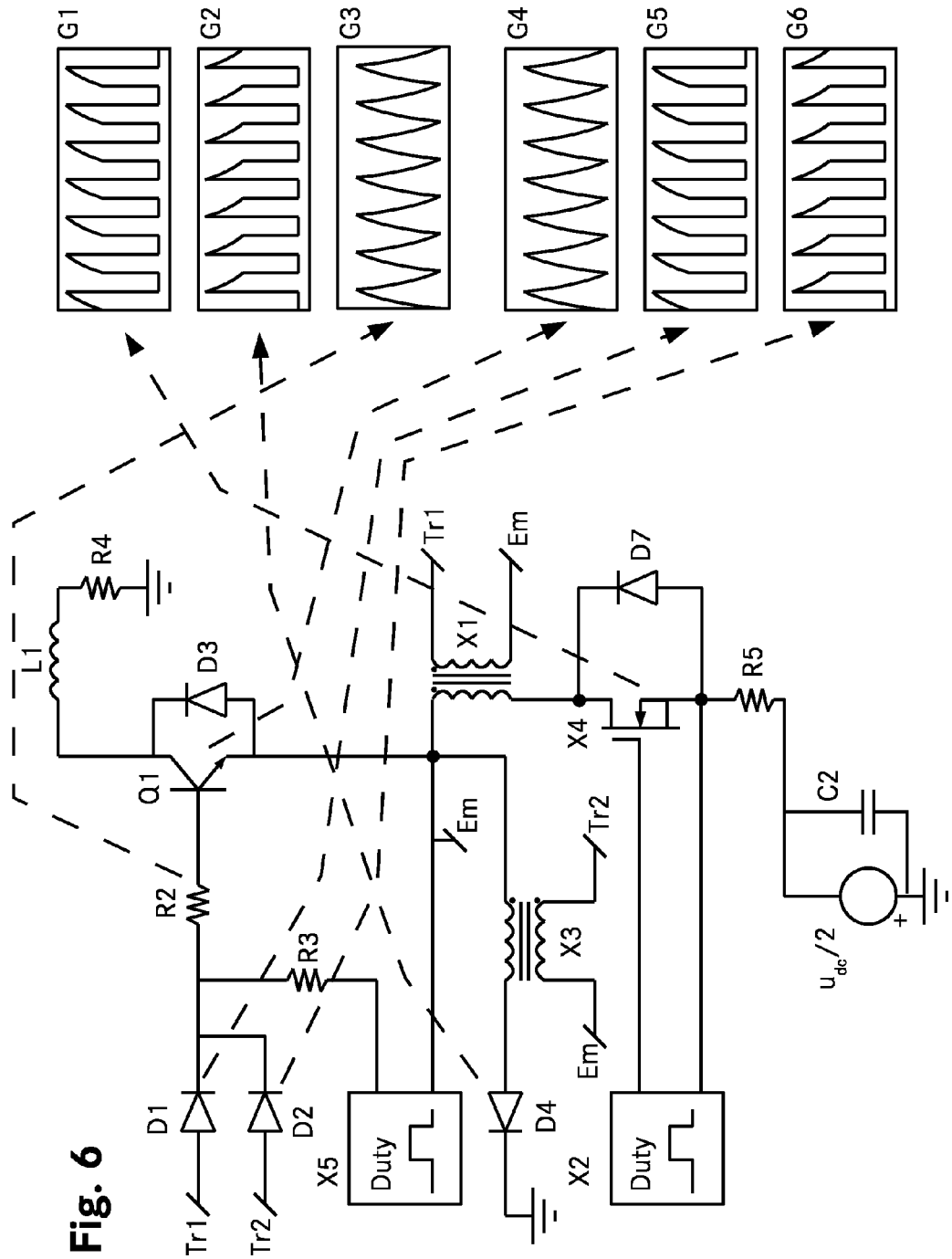
FIG. 6 simulation model for the lower part of the inverter.

FIG. 6 shows the lower part of one phase of the inverter. The collector of BJT switch Q1 is connected through inductor L1 and resistor R4 to the neutral point or mass. The emitter of BJT switch Q1 is connected to the primary winding of current transformer X3, which is further connected in conduction direction through diode D4 to neutral point or mass. The emitter of BJT switch Q1 is also connected to control block X5, which is further connected through resistor R3 and resistor R2 to the base of the BJT switch Q1. The control block X5 may have a frequency of F=50 Hz. The emitter of BJT switch Q1 is also connected through the primary winding of current transformer X1 to the drain of MOSFET switch X4. The source of MOSFET switch X4 is connected through resistor R5 to the negative end of input source $u_{dc}/2$, which has capacitor C2 connected in parallel. A diode D3 is connected in conducting direction between emitter and collector of BJT switch Q1. A diode D7 is connected in conducting direction between source and drain of MOSFET switch D7. The source of MOSFET switch X4 is also connected to the control block X2, which is further connected to the gate of MOSFET switch X4. The control block X2 may have a duty cycle of F=10 kHz, for example. The emitter of the BJT switch Q1 is connected to the secondary winding of current transformer X3, which secondary winding is further connected in conducting direction through diode D2 to the connection point between resistor R3 and resistor R2. The emitter of the BJT switch Q1 is also connected to the secondary winding of current transformer X1, which secondary winding is further connected in conducting direction through diode D1 to the connection point between resistor R3 and R2.

For example, the inductor L1 may have an inductance of 1.5 mH, the resistor R4 a resistance of 20Ω, the resistor R1 a resistance of 0.1Ω, the resistor R2 a resistance of 1Ω, the resistor R3 a resistance of 100Ω, the resistor R5 a resistance of 1Ω, and the capacitors C1 and C2 capacitances of 100 μF. The input source $u_{dc}/2$ may have a voltage of 200V, for example.

Figure 7:
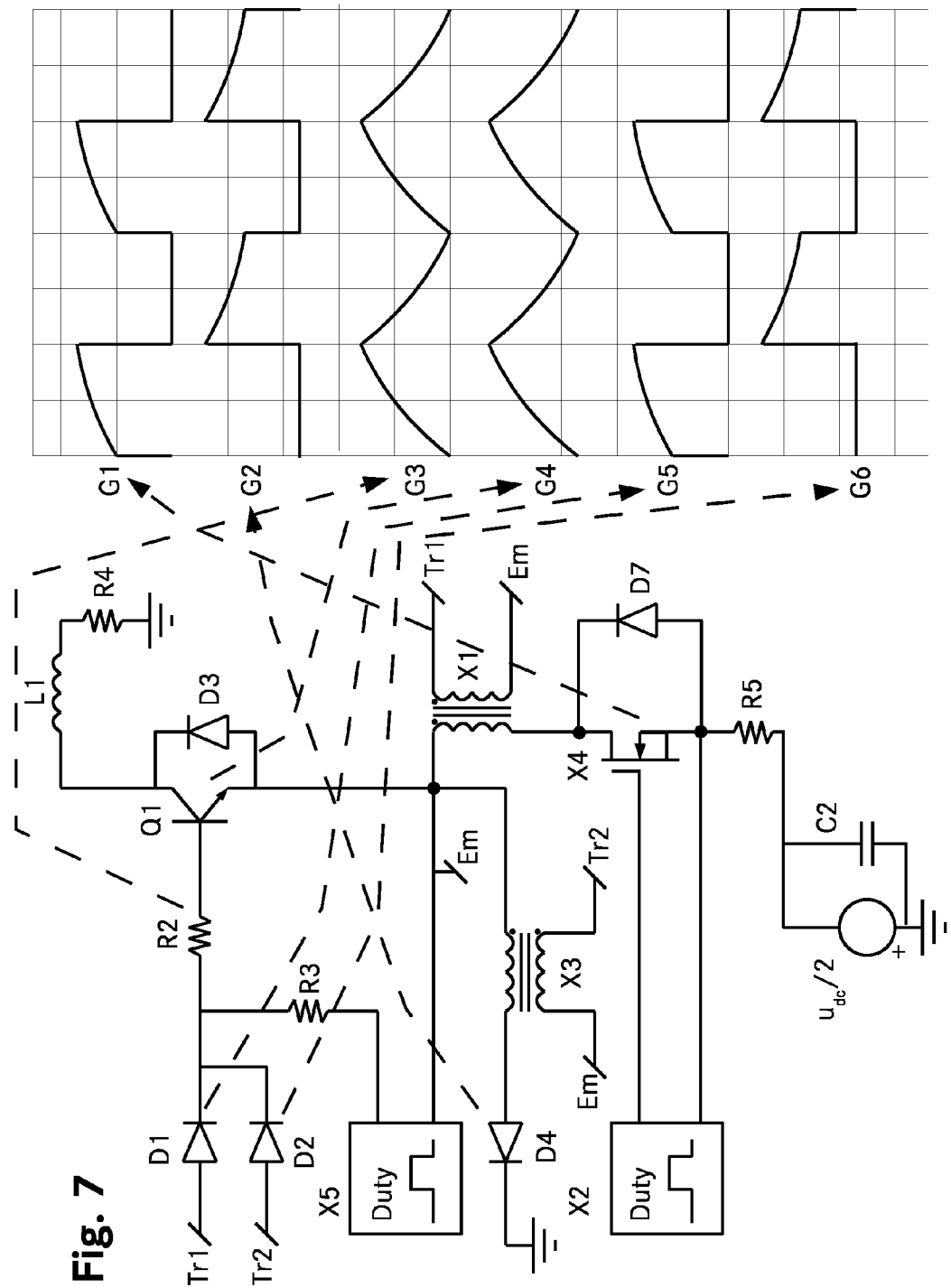
FIG. 7 timing diagram for the lower part of the inverter.

FIG. 7 shows quantitatively the timing diagram of the current amplitude versus time at the already described various locations of the lower part of one phase of the inverter.

In summary, it is to be noted that a power conversion system and a method for power conversion have been described which have a high efficiency.

The invention claimed is:
1. Power conversion system, wherein
a. a first switch is connected between an upper end of a input voltage source and an upper end of a second switch,
b. wherein the lower end of the second switch is connected to an upper end of a third switch,
c. wherein the lower end of the third switch is connected to an upper end of a fourth switch,
d. wherein the lower end of the fourth switch is connected to the lower end of the input voltage source, e. wherein a first diode is connected in conducting direction between a neutral point and the upper end of the second switch,
f. wherein a second diode is connected between the lower end of the third switch and the neutral point,
characterized in that
g. two or more current transformers are arranged,
h. wherein a drive signal is produced on the basis of secondary winding currents of the current transformers in an interleaved mode.

2. Power conversion system according to claim 1, characterized in that the first switch and the fourth switch include a semi-conductor of a first manufacturing technology, in particular a MOSFET switch, a JFET switch or a IGBT switch, and that the second switch and the third switch include a semi-conductor of a second manufacturing technology, in particular a BJT switch.

3. Power conversion system according to claim 1, characterized in that a first capacitor is connected between the upper end of the input voltage source and the neutral point, and that a second capacitor is connected between the neutral point and the lower end of the input voltage source.

4. Power conversion system according to claim 1, characterized in that diodes are connected in conducting direction between the lower end and the upper end of the first, second, third and fourth switches.

5. Power conversion system according to claim 4, characterized in that the lower end of the first switch is connected through the primary winding of a second current transformer to the upper end of the second switch and that the first diode is connected through the primary winding of a first current transformer to the upper end of the second switch, or that the lower end of the third switch is connected through the primary winding of a third current transformer to the upper end of the fourth switch and that the upper end of the fourth switch is connected through the primary winding of a fourth current transformer to the second diode.

6. Power conversion system according to claim 1, characterized in that the secondary winding of a first current transformer is connected in conducting direction through a diode to a control port of the second switch, or that the secondary winding of a second current transformer is connected in conducting direction through a diode to a control port of the second switch, or that the secondary winding of a third current transformer is connected in conducting direction through a diode to a control port of the third switch, or that the secondary winding of a fourth current transformer is connected in conducting direction through a diode to a control port of the third switch.

7. Power conversion system according to claim 1, characterized in that the lower end of the second switch is connected through a first control block and a resistor to a control port of the second switch, or that the lower end of the third switch is connected through a second control block and a resistor to a control port of the third switch.

8. Power conversion system according to claim 1, characterized in that the connection point between the second switch and the third switch is connected to a load.

9. Power conversion system according to claim 1, characterized in that multiple phases, in particular 3 phases, are provided, wherein each phase includes a first switch, a second switch, a third switch, a fourth switch, a first diode, a second diode, wherein in each phase if applicable a first current transformer, a second current transformer, a third current transformer, a fourth current transformer, or control blocks are provided as previously defined, wherein the connection point between the second switch and the third switch is connected to a load, in particular to a power grid or to an electric power system.

10. Method for power conversion,
a. wherein a first switch, a second switch, a third switch, and a fourth switch are switched according to a switching states table,
b. wherein the first switch is connected between an upper end of a input voltage source and an upper end of the second switch,
c. wherein the lower end of the second switch is connected to an upper end of the third switch,
d. wherein the lower end of the third switch is connected to an upper end of the fourth switch,
e. wherein the lower end of the fourth switch is connected to the lower end of the input voltage source,
f. wherein a first diode is connected in conducting direction between a neutral point and the upper end of the second switch,
g. wherein a second diode is connected between the lower end of the third switch and the neutral point,
characterized in that
h. two or more transformers are operated to produce a drive signal on the basis of secondary winding currents of the transformers in an interleaved mode.

11. Method according to claim 10, characterized in that the first switch and the fourth switch include a semi-conductor of a first manufacturing technology, in particular a MOSFET switch, a JFET switch or a IGBT switch, and that the second switch and the third switch include a semi-conductor of a second manufacturing technology, in particular a BJT switch.

12. Method according to claim 10, characterized in that in a first switching state the first switch and the second switch are switched on and the third switch and the fourth switch are switched off, that in a second switching state the first switch is switched off and the second switch and the third switch are switched on and the fourth switch is switched off, and that in a third switching state the first switch and the second switch are switched off and the third switch and the fourth switch are switched on.

13. Method according to claim 10, characterized in that the second switch and the third switch are controlled through a first current transformer, a second current transformer, a third current transformer, and a fourth current transformer, wherein the lower end of the first switch is connected through the primary winding of the second current transformer to the upper end of the second switch, and the lower end of the third switch is connected through the primary winding of the third current transformer to the upper end of the fourth switch, wherein the first diode is connected through the primary winding of the first current transformer to the upper end of the second switch, and the upper end of the fourth switch is connected through the primary winding of the fourth current transformer to the second diode, wherein the secondary winding of the first current transformer is connected in conducting direction through a diode to a control port of the second switch, and that the secondary winding of the second current transformer is connected in conducting direction through a diode to a control port of the second switch, and that the secondary winding of a third current transformer is connected in conducting direction through a diode to a control port of the third switch, and that the secondary winding of the fourth current transformer is connected in conducting direction through a diode to a control port of the third switch.

14. Method according to claim 10, characterized in that the second switch and the third switch are controlled through a first control block and a second control block, wherein the lower end of the second switch is connected through the first control block and a resistor to a control port of the second switch, or that the lower end of the third switch is connected through the second control block and a resistor to a control port of the third switch.

15. Method according to claim 10, characterized in that multiple phases, in particular 3 phases, are controlled, wherein each phase includes a first switch, a second switch, a third switch, a fourth switch, a first diode, a second diode, wherein in each phase if applicable a first current transformer, a second current transformer, a third current transformer, a fourth current transformer, or control blocks are provided as previously defined, wherein the connection point between the second switch and the third switch is connected to a load, in particular to a power grid or to an electric power system.

16. Power conversion system according to claim 2, characterized in that a first capacitor is connected between the upper end of the input voltage source and the neutral point, and that a second capacitor is connected between the neutral point and the lower end of the input voltage source.

17. Power conversion system according to claim 2, characterized in that diodes are connected in conducting direction between the lower end and the upper end of the first, second, third and fourth switches.

18. Power conversion system according to claim 3, characterized in that diodes are connected in conducting direction between the lower end and the upper end of the first, second, third and fourth switches.

19. Power conversion system according to claim 2, characterized in that the secondary winding of a first current transformer is connected in conducting direction through a diode to a control port of the second switch, or that the secondary winding of a second current transformer is connected in conducting direction through a diode to a control port of the second switch, or that the secondary winding of a third current transformer is connected in conducting direction through a diode to a control port of the third switch, or that the secondary winding of a fourth current transformer is connected in conducting direction through a diode to a control port of the third switch.

20. Power conversion system according to claim 3, characterized in that the secondary winding of a first current transformer is connected in conducting direction through a diode to a control port of the second switch, or that the secondary winding of a second current transformer is connected in conducting direction through a diode to a control port of the second switch, or that the secondary winding of a third current transformer is connected in conducting direction through a diode to a control port of the third switch, or that the secondary winding of a fourth current transformer is connected in conducting direction through a diode to a control port of the third switch.

* * * * *